(12) United States Patent
Kuo et al.

(10) Patent No.: US 9,285,047 B2
(45) Date of Patent: Mar. 15, 2016

(54) REGULATOR VALVE (71) Applicants: Chungyu Kuo, Taichung (TW); Mingchia Wu, Taichung (TW)

(72) Inventors: Chungyu Kuo, Taichung (TW); Mingchia Wu, Taichung (TW)

(73) Assignee: GLOBE UNION INDUSTRIAL CORP., Taichung (TW)

( * ) Notice: Subject to any disclaimer, the term of this patent is extended or adjusted under 35 U.S.C. 154(b) by 114 days.

(21) Appl. No.: 14/274,730

(22) Filed: May 11, 2014

(65) Prior Publication Data

US 2015/0107701 A1   Apr. 23, 2015

(30) Foreign Application Priority Data

Oct. 17, 2013 (CN) ............... 2013 2 0643357 U (51) Int. Cl.
| | |
|---|---|
| F16K 31/12 | (2006.01) |
| F16K 17/06 | (2006.01) |
| F16K 31/122 | (2006.01) |
| F16K 27/02 | (2006.01) |
| F16K 15/02 | (2006.01) |
| F16K 15/06 | (2006.01) |
| F16K 27/12 | (2006.01) |
| G05D 16/10 | (2006.01) |
| F16K 1/38 | (2006.01) |

(52) U.S. Cl.
CPC .............. *F16K 17/06* (2013.01); *F16K 15/026* (2013.01); *F16K 15/063* (2013.01); *F16K 27/0209* (2013.01); *F16K 27/0254* (2013.01); *F16K 27/12* (2013.01); *F16K 31/1221* (2013.01); *F16K 31/1223* (2013.01); *G05D 16/10* (2013.01); *F16K 1/385* (2013.01); *Y10T 137/7825* (2015.04); *Y10T 137/7925* (2015.04)

(58) Field of Classification Search
CPC ................... Y10T 137/7818; Y10T 137/7819; Y10T 137/7822; Y10T 137/7823; Y10T 137/7825; Y10T 137/7877; F16K 1/385
See application file for complete search history.

(56) References Cited

U.S. PATENT DOCUMENTS

| | | | | |
|---|---|---|---|---|
| 129,015 | A * | 7/1872 | Fay .......................... | F17C 13/04 137/505.35 |
| 3,062,525 | A * | 11/1962 | Schutmaat ......... | G05D 16/0661 137/505.41 |
| 3,857,407 | A * | 12/1974 | Olson .................... | A01G 25/16 137/495 |
| 4,188,971 | A * | 2/1980 | Otteson .................. | F16K 17/34 137/460 |
| 6,276,392 | B1 * | 8/2001 | Hendrickson ...... | G05D 16/0661 137/271 |
| 2008/0047619 | A1 * | 2/2008 | Pechtold ................ | G05D 16/10 137/505.41 |

* cited by examiner

*Primary Examiner* — R. K. Arundale (57) ABSTRACT

A regulator valve contain: a housing, a left end cap, a right end cap, and a valve core assembly. The housing includes a left cavity, a right cavity, a valve hole, a left opening, and a right opening. The right cavity has an inlet, the valve hole has an outlet, and between the right cavity and the valve hole is defined a seat portion, the seat portion has an inwardly conical fence, a diameter of which decreases from the right cavity to the valve hole. The left end cap is connected with and closes the left opening. The right end cap is coupled with and closes the right opening. The valve core assembly is inserted through the valve hole and includes a piston portion and a closing portion.

6 Claims, 8 Drawing Sheets

| Change between pressure and water flow | | |
|---|---|---|
| Pressure (PSI) | Water flow (LPM) | Percentage of water flow relative to 50 PSI |
| 10 | 12.84 | -47% |
| 20 | 17.07 | -30% |
| 30 | 20.23 | -17% |
| 40 | 22.33 | -9% |
| 50 | 24.43 | 0% |
| 60 | 26.03 | 7% |
| 70 | 26.78 | 10% |
| 80 | 26.78 | 10% |
| 90 | 25.54 | 5% |
| 100 | 22.45 | -8% |

REGULATOR VALVE

FIELD OF THE INVENTION

The present invention relates to a valve component fixed in a flushing system of a toilet, and more particularly to a regulator valve.

BACKGROUND OF THE INVENTION

A conventional regulator valve is fixed in a flushing system of a toilet to decrease and stabilize water pressure and water flow at a high pressure.

CN Publication No. 102678994A disclosed a conventional regulator valve is fixed in a flushing system of a toilet without a water tank.

Figure 1:
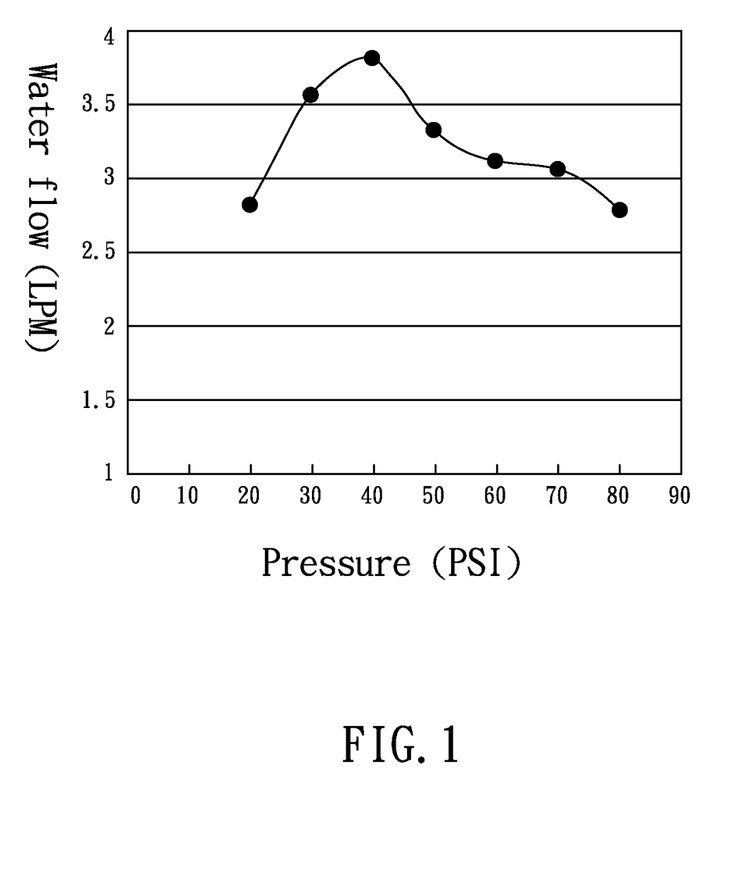
FIG. 1 is a diagram showing a testing relationship between a water pressure and a water flow of a convention regulator valve.
Figure 2:
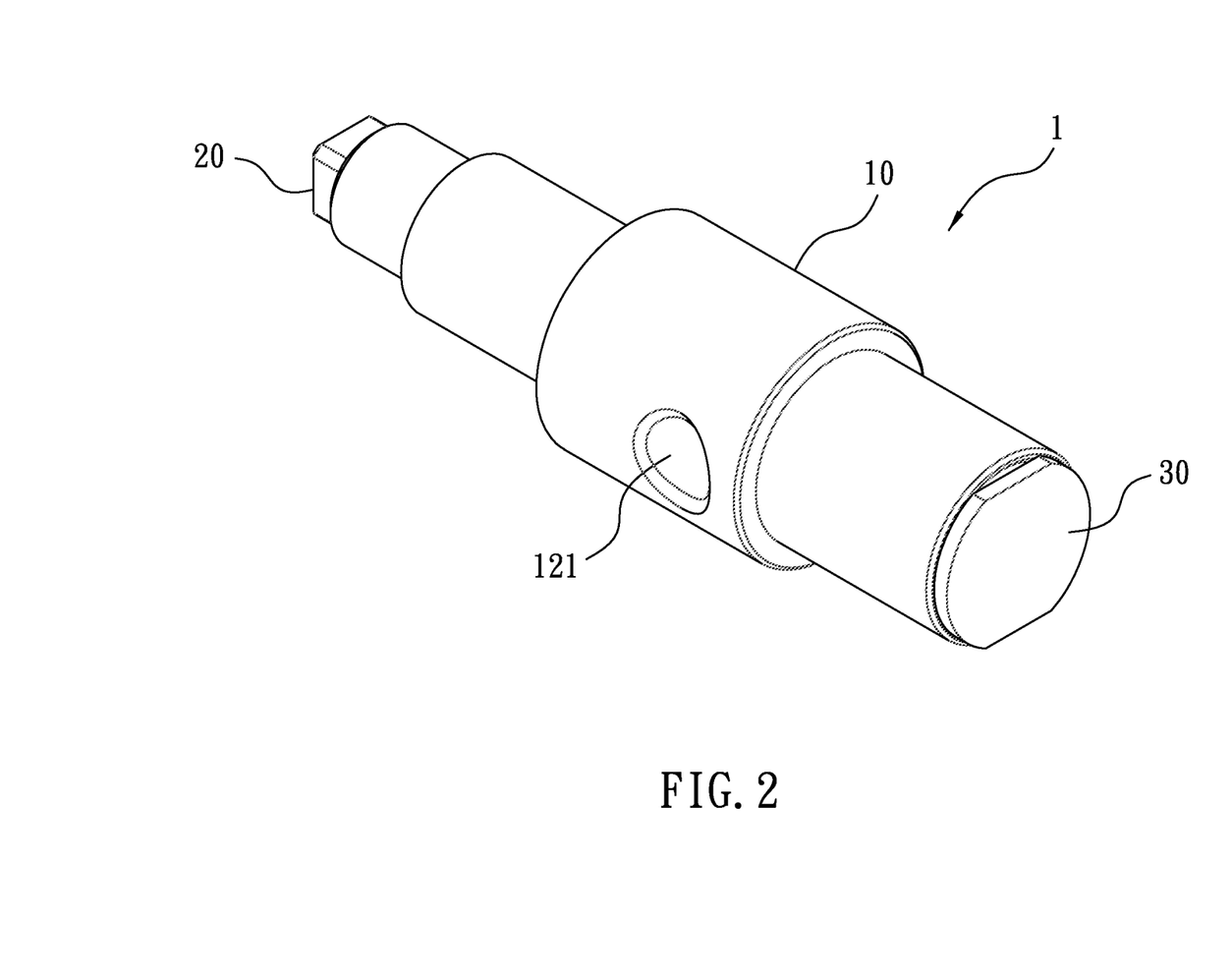
FIG. 2 is a perspective view showing the assembly of a regulator valve according to a preferred embodiment of the present invention.
Figure 3:
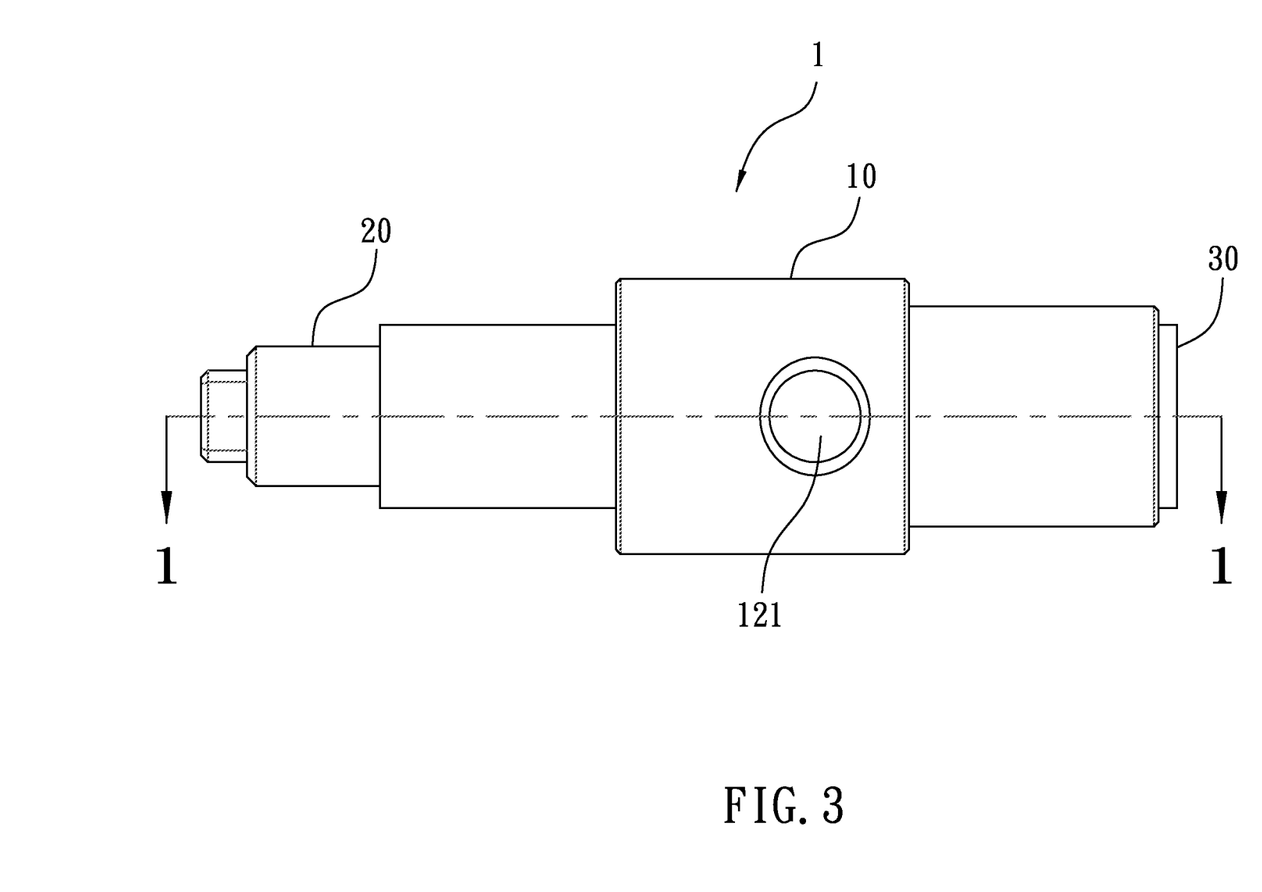
FIG. 3 is a plane view showing the assembly of the regulator valve according to the preferred embodiment of the present invention.

As illustrated in FIG. 1, when water pressure is lowered to 40 PSI, the water flow is up to 3.8 LPM, and when the water pressure is decreased to 20 PSI, the water flow reduces accordingly, such as 2.8 LPM. While the water flows at 80 PSI, the water flow is also lowered to 2.8 LPM, thus causing 26% of reduction. Therefore, when water flows at a high pressure, the water flow in the conventional regulator valve is decreased to decline flushing effect.

It is because that a closing ring of a valve core of the conventional regulator valve cannot match with an inner cavity of a valve seat well. In other words, when the water pressure is raised to lower a width of a slit between the closing ring and the inner cavity, then the water flow decreases quickly. Also, when the valve core moves at the high pressure to reduce the water pressure, the water is stopped flowing, hence the water pressure and the water flow cannot be stabilized.

The present invention has arisen to mitigate and/or obviate the afore-described disadvantages.

SUMMARY OF THE INVENTION

One aspect of the present invention is to provide a regulator valve which decreases and stabilizes water pressure and water flow when the water pressure is at 50 to 100 PSI.

Another aspect of the present invention is to provide a regulator valve which is closed automatically when the water pressure is more than 100 PSI to protect related components of the regulator valve.

To obtain the above aspects, a regulator valve provided by the present invention contains a housing, a left end cap, a right end cap, and a valve core assembly.

The housing includes a left cavity, a right cavity communicating with the left cavity, a valve hole defined between and communicating with the left cavity and the right cavity, a left opening formed on a left side thereof, and a right opening arranged on a right side thereof; the right cavity has an inlet defined on a peripheral wall thereof; the valve hole has an outlet formed on a peripheral wall thereof; between the right cavity and the valve hole is defined a seat portion, and the seat portion has an inwardly conical fence, a diameter of which decreases from the right cavity to the valve hole;

a left end cap is connected with and closes the left opening of the housing;

a right end cap is coupled with and closes the right opening of the housing;

a valve core assembly is inserted through the valve hole of the housing and includes a piston portion formed on a left side thereof and limited to slide in the left cavity of the housing and including a closing portion arranged on a right side thereof, such that the closing portion contacts with the inwardly conical fence of the housing or a flowing slit is defined between the closing portion and the inwardly conical fence of the housing, and the valve core assembly slides automatically with a pressure change of the piston portion to change a width of the flowing slit, thus controlling water pressure and water flow from the inlet to the outlet.

The regulator valve further contains an adjusting spring mounted between the left end cap and the valve core assembly, wherein the left end cap is a pressure adjusting nut and screws with the left opening of the left end cap to adjustably rotate the left end cap so that an elasticity of the adjusting spring acting on the left side of the valve core assembly is adjusted.

The left end cap includes a fixing groove defined on a right end thereof; the valve core assembly includes a positioning post extending outwardly from the left side thereof; a first end of the adjusting spring is biased against the fixing groove, and a second end of the adjusting spring is fitted with the positioning post.

The valve core assembly further includes a piston part and a core part; the piston part has the piston portion, the positioning post, and a screwing orifice defined on the right side thereof; the core part has the closing portion formed thereon and has a screw bolt arranged on a left end thereof and screwing with the screwing orifice of the piston portion, such that the screw bolt is adjustably rotated to control a position of the closing portion relative to the seat portion.

The valve core assembly further includes a piston part and a core part; the piston part has the piston portion and a screwing orifice defined on the right side thereof; the core part has the closing portion formed thereon and has a screw bolt arranged on a left end thereof and screwing with the screwing orifice of the piston portion, such that the screw bolt is adjustably rotated to control a position of the closing portion relative to the seat portion.

A first half taper angle of the inwardly conical fence of the seat portion is within 40 to 50 degrees; the closing portion is located at a connecting area of a first conical face and a second conical face, a second half taper angle of the first conical face relative to the right cavity is 4 to 9 degrees; a third half taper angle of the second conical face relative to the valve hole is 3 to 13 degrees more than the first half taper angle of the inwardly conical fence of the seat portion.

The first half taper angle of the inwardly conical fence of the seat portion is 45 degrees; the second half taper angle of the first conical face relative to the right cavity is 6.5 degrees; and the third half taper angle of the second conical face relative to the valve hole is 8 degrees more than the first half taper angle of the inwardly conical fence of the seat portion.

Accordingly, when water flows in the regulator valve at a high pressure, the closing portion of the valve core assembly moves close to the inwardly conical fence, yet the seat portion has the inwardly conical fence, so the closing portion moves to decrease a change of the flowing slit gently, thereby reducing and stabilizing the water flow at the high pressure.

The closing portion of the regulator valve cooperates with the first conical face and the second conical face; wherein the second half taper angle of the first conical face is employed to form a conical flowing space between the first conical face and the inwardly conical fence of the seat portion, such that the water is guided to flow toward the valve hole and the outlet stably via the flowing slit S between the closing portion and the seat portion.

The valve core assembly of the regulator valve allows reducing the water pressure by adjusting the position of the closing portion relative to the seat portion, when the water pressure is more than 50 PSI. Furthermore, the position of the closing portion relative to the seat portion is controlled by adjustably rotating the core part and the piston part. Preferably, the left end cap is adjustably rotated to move the valve core assembly leftward when the water pressure is over 50 PSI so as to decrease a size of the flowing slit, thereby controlling the water pressure and the water flow effectively.

The regulator valve of the present invention comprises the first half taper angle of the inwardly conical fence of the seat portion, the closing portion, the second half taper angle of the first conical face, and the third half taper angle of the second conical face to decrease and stabilize the water pressure and the water flow, hence the regulator valve is fixed in a flushing system of a toilet to discharge sewage stably at the high pressure.

DETAILED DESCRIPTION OF THE PREFERRED EMBODIMENTS

With reference to FIGS. 2-5, a regulator valve 1 according to a preferred embodiment of the present invention comprises a housing 10, a left end cap 20, a right end cap 30, and a valve core assembly 40.

Figure 4:
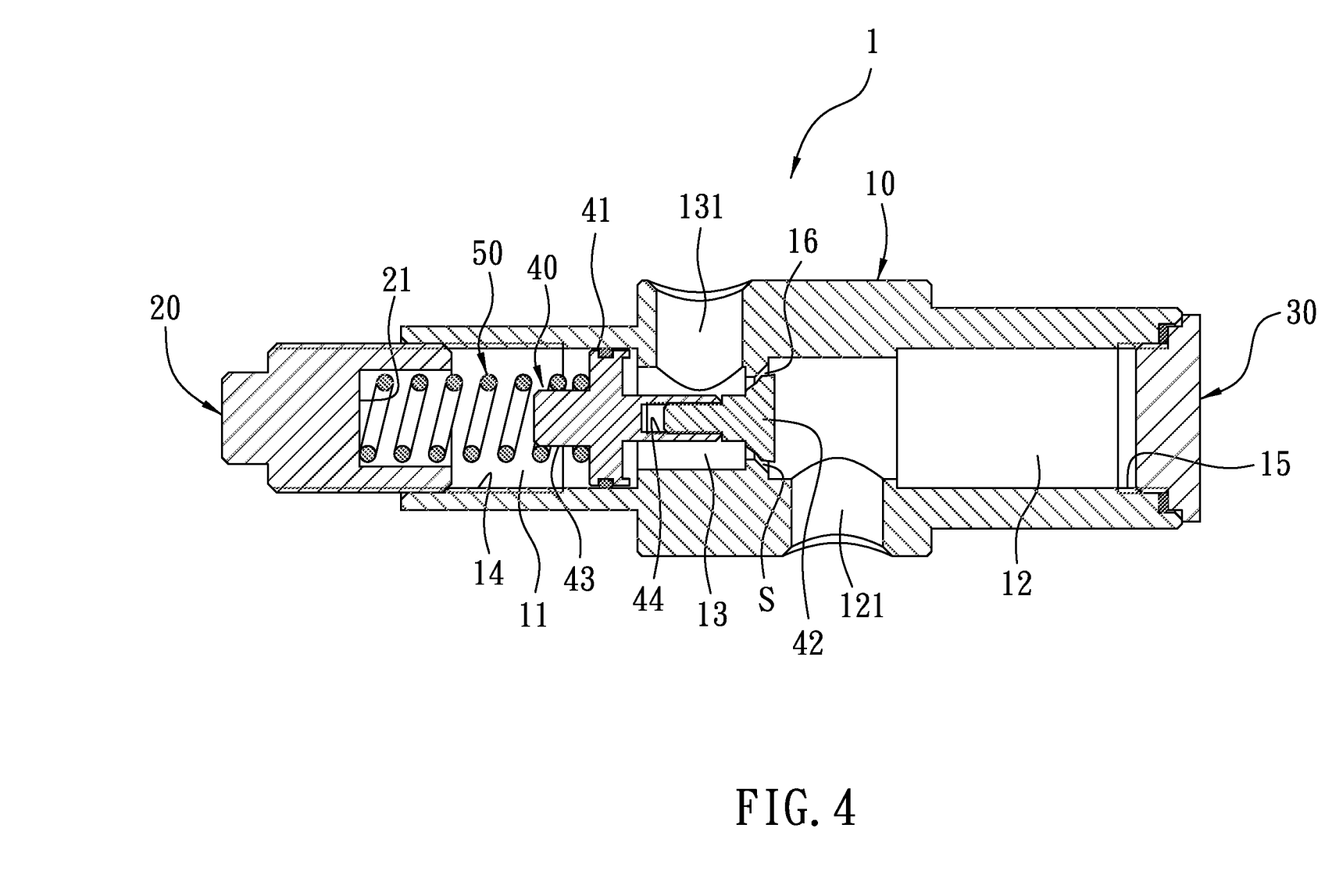
FIG. 4 is a cross sectional view taken along lines 1-1 of FIG. 3.
Figure 5:
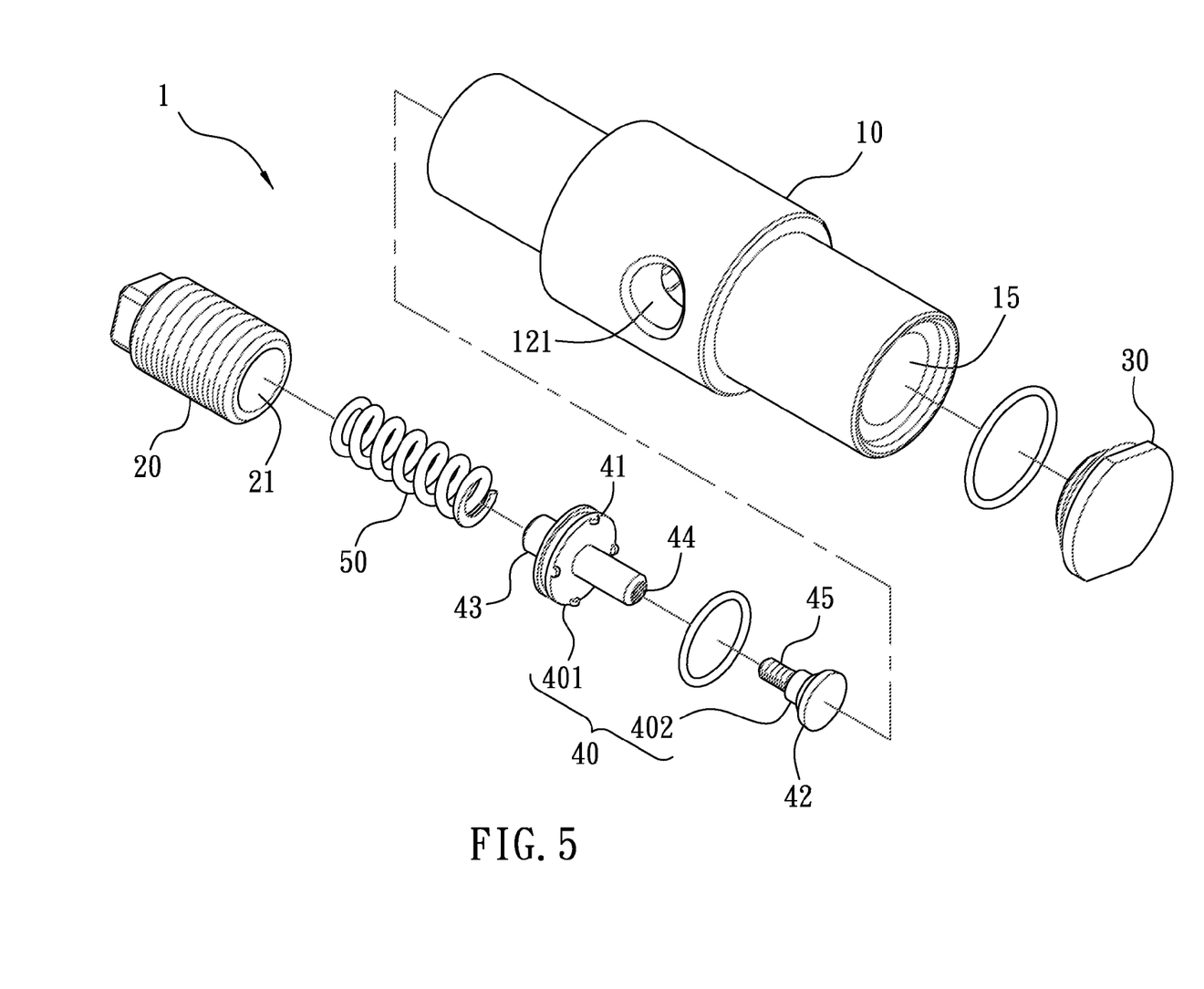
FIG. 5 is a perspective showing the exploded components of the regulator valve according to the preferred embodiment of the present invention.

The housing 10 includes a left cavity 11, a right cavity 12 communicating with the left cavity 11, a valve hole 13 defined between and communicating with the left cavity 11 and the right cavity 12, a left opening 14 formed on a left side thereof, and a right opening 15 arranged on a right side thereof. The right cavity 12 has an inlet 121 defined on a peripheral wall thereof; the valve hole 13 has an outlet 131 formed on a peripheral wall thereof; between the right cavity 12 and the valve hole 13 is defined a seat portion 16, and the seat portion 16 has an inwardly conical fence, a diameter of which decreases from the right cavity 12 to the valve hole 13.

Figure 6:
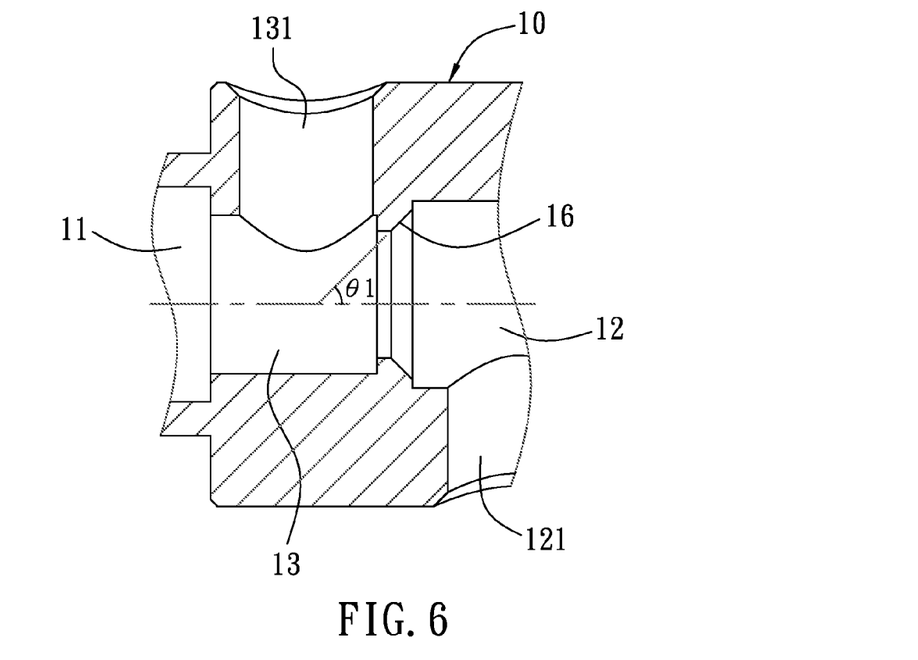
FIG. 6 is a cross sectional view of a part of a seat portion of the regulator valve according to the preferred embodiment of the present invention.

Referring to FIG. 6, a first half taper angle θ1 of the inwardly conical fence of the seat portion 16 is 45 degrees, but it is not limited to 45 degrees. For example, the first half taper angle θ1 of the inwardly conical fence of the seat portion 16 is within 40 to 50 degrees.

The left end cap 20 is connected with and closes the left opening 14 of the housing 10.

The right end cap 30 is coupled with and closes the right opening 15 of the housing 10.

Figure 7:
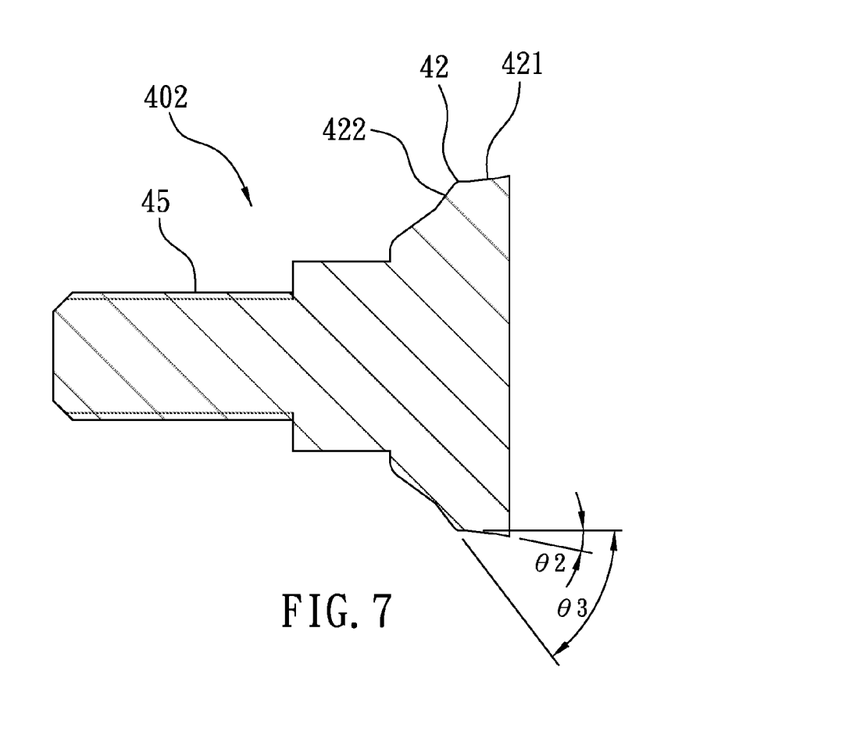
FIG. 7 is a cross sectional view of a core part of the regulator valve according to the preferred embodiment of the present invention.
Figure 8:
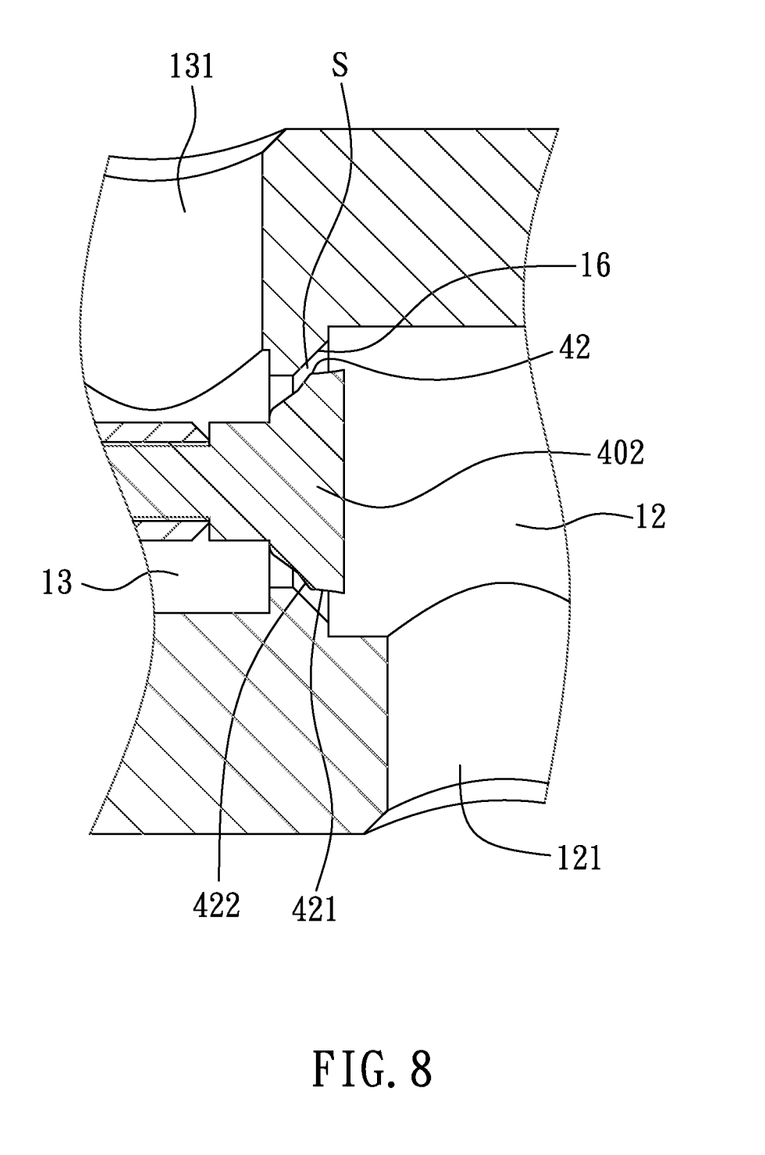
FIG. 8 is a cross sectional view of the set portion and a closing portion of the regulator valve according to the preferred embodiment of the present invention.

The valve core assembly 40 is inserted through the valve hole 13 of the housing 10 and includes a piston portion 41 formed on a left side thereof and limited to slide in the left cavity 11 of the housing 10 and includes a closing portion 42 arranged on a right side thereof, as shown in FIG. 7, such that the closing portion 42 contacts with the inwardly conical fence of the housing 10 or a flowing slit S is defined between the closing portion 42 and the inwardly conical fence of the housing 10 as illustrated in FIG. 8. Thereby, the valve core assembly 40 slides automatically with a pressure change of the piston portion 41 to change a width of the flowing slit S, thus controlling water pressure and water flow from the inlet 121 to the outlet 131.

The regulator valve 1 further comprises an adjusting spring 50 mounted between the left end cap 20 and the valve core assembly 40, and the left end cap 20 is a pressure adjusting nut and screws with the left opening 14 of the left end cap 20 to adjustably rotate the left end cap 20 so that an elasticity of the adjusting spring 50 acting on the left side of the valve core assembly 40 is adjusted.

The left end cap 20 includes a fixing groove 21 defined on a right end thereof; the valve core assembly 40 includes a positioning post 43 extending outwardly from the left side thereof; a first end of the adjusting spring 50 is biased against the fixing groove 21, and a second end of the adjusting spring 50 is fitted with the positioning post 43.

The valve core assembly 40 further includes a piston part 401 and a core part 402; the piston part 401 has the piston portion 41, the positioning post 43, and a screwing orifice 44 defined on the right side thereof; the core part 402 has the closing portion 42 formed thereon and has a screw bolt 45 arranged on a left end thereof and screwing with the screwing orifice 44 of the piston portion 41, such that the screw bolt 45 is adjustably rotated to control a position of the closing portion 42 relative to the seat portion 16.

Referring to FIG. 7, the closing portion 42 is located at a connecting area of a first conical face 421 and a second conical face 422, a second half taper angle θ2 of the first conical face 421 relative to the right cavity 12 is 6.5 degrees, but it is not limited to 6.5 degrees. For instance, the second half taper angle θ2 of the first conical face 421 is within 4 to 9 degrees. A third half taper angle θ3 of the second conical face 422 relative to the valve hole 13 is 8 degrees more than the first half taper angle θ1 of the inwardly conical fence of the seat portion 16, yet it is not limited to 8 degrees more than the first half taper angle θ1. For example, the third half taper angle θ3 of the second conical face 422 relative to the valve hole 13 is 3 to 13 degrees more than the first half taper angle θ1 of the inwardly conical fence.

It is to be noted that when water flows in the regulator valve 1 at a high pressure, the closing portion 42 of the valve core assembly 40 moves close to the inwardly conical fence, yet the seat portion 16 has the inwardly conical fence, so the closing portion 42 moves to decrease a change of the flowing slit S gently, thereby reducing and stabilizing the water flow at the high pressure.

The closing portion 42 of the regulator valve 1 cooperates with the first conical face 421 and the second conical face 422; wherein the second half taper angle θ2 of the first conical face 421 is employed to form a conical flowing space between the first conical face 421 and the inwardly conical fence of the seat portion 16, such that the water is guided to flow toward the valve hole 13 and the outlet 131 stably via the flowing slit S between the closing portion 42 and the seat portion 16.

The valve core assembly 40 of the regulator valve 1 allows reducing the water pressure by adjusting the position of the closing portion 42 relative to the seat portion 16, when the water pressure is more than 50 PSI. Furthermore, the position of the closing portion 42 relative to the seat portion 16 is controlled by adjustably rotating the core part 402 and the piston part 401. Preferably, the left end cap 20 is adjustably rotated to move the valve core assembly 40 leftward when the water pressure is over 50 PSI so as to decrease a size of the flowing slit S, thereby controlling the water pressure and the water flow effectively.

The regulator valve 1 of the present invention comprises the first half taper angle θ1 of the inwardly conical fence of the seat portion 16, the closing portion 42, the second half taper angle θ2 of the first conical face 421, and the third half taper angle θ3 of the second conical face 422 to decrease and stabilize the water pressure and the water flow, hence the regulator valve 1 is fixed in a flushing system of a toilet to discharge sewage stably at the high pressure.

Figure 9:
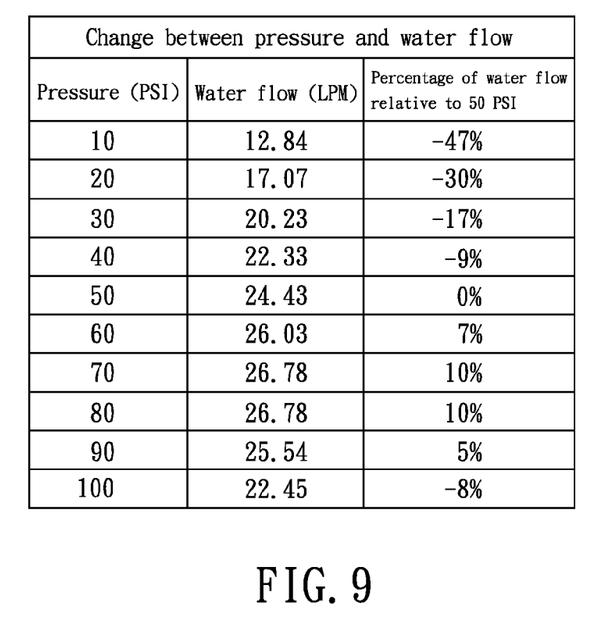
FIG. 9 is diagram showing a testing result of a water pressure and a water flow of the regulator valve according to the preferred embodiment of the present invention.
Figure 10:
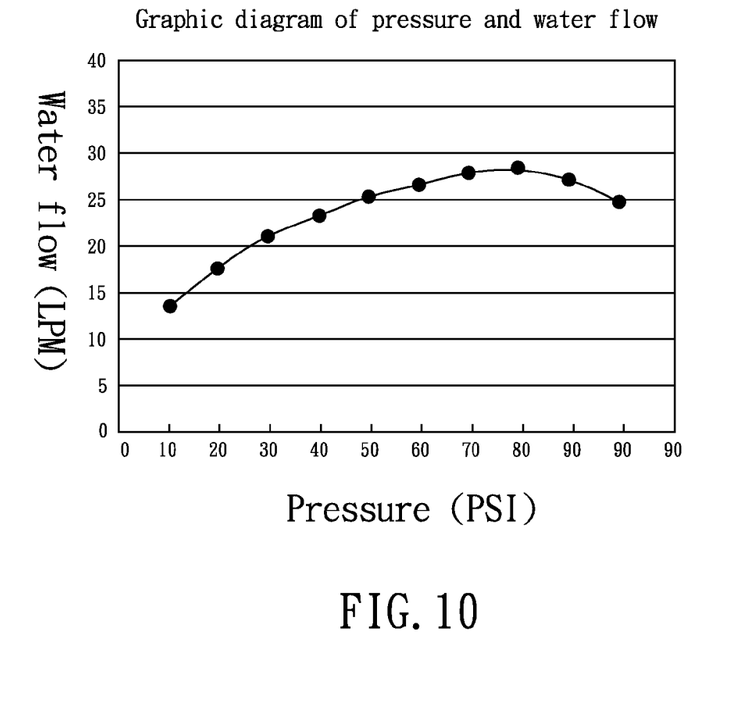
FIG. 10 is a graphic diagram showing a change of the water pressure and the water flow of the regulator valve according to the preferred embodiment of the present invention.

FIGS. 9 and 10 are a diagram showing a testing result of the water pressure and the water flow of the regulator valve 1, wherein when the water pressure is over 50 PSI, a change rate of the water flow of the regulator valve 1 relative to 50 PSI is 10%. Since a change rate of the conventional regulator valve is over 20%, the water pressure and the water flow of the regulator valve 1 of the present invention is more stable.

In addition, as illustrated in FIGS. 9 and 10, when the water pressure increases to 100 PSI, the water flow at 100 PSI decreases relative to 50 PSI, and when the water pressure increases over 100 PSI, the closing portion 42 contacts with the seat portion 16 to stop water flowing to the outlet 131 from the inlet 121, thus protecting related components of the regulator valve 1.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A regulator valve comprising
a housing including a left cavity, a right cavity communicating with the left cavity, a valve hole defined between and communicating with the left cavity and the right cavity, a left opening formed on a left side of the housing, and a right opening arranged on a right side of the housing; the right cavity having an inlet defined on a peripheral wall of the right cavity; the valve hole having an outlet formed on a peripheral wall of the valve hole; between the right cavity and the valve hole being defined a seat portion, and the seat portion having an inwardly conical fence, a diameter of the inwardly conical fence decreases from the right cavity to the valve hole;
a left end cap connected with and closing the left opening of the housing;
a right end cap coupled with and closing the right opening of the housing;
a valve core assembly inserted through the valve hole of the housing and including a piston portion formed on a left side of the valve core assembly and limited to slide in the left cavity of the housing and including a closing portion arranged on a right side of the valve core assembly, such that the closing portion contacts with the inwardly conical fence of the housing or a flowing slit is defined between the closing portion and the inwardly conical fence of the housing, and the valve core assembly slides in response to a pressure change acting on the piston portion to change a width of the flowing slit, thus controlling water pressure and water flow from the inlet to the outlet;
wherein a first half taper angle θ1 of the inwardly conical fence of the seat portion relative to the seat portion is within 40 to 50 degrees; the closing portion is located at a connecting area of a first conical face and a second conical face, a second half taper angle θ2 of the first conical face relative to the right cavity is 4 to 9 degrees; a third half taper angle θ3 of the second conical face relative to the valve hole is 3 to 13 degrees more than the first half taper angle of the inwardly conical fence of the seat portion.

2. The regulator valve as claimed in claim 1 further comprising an adjusting spring mounted between the left end cap and the valve core assembly, wherein the left end cap is a pressure adjusting nut and screws with the left opening of the left end cap to adjustably rotate the left end cap so that an elasticity of the adjusting spring acting on the left side of the valve core assembly is adjusted.

3. The regulator valve as claimed in claim 2, wherein the left end cap includes a fixing groove defined on a right end of the left end cap; the valve core assembly includes a positioning post extending outwardly from the left side of the valve core assembly; a first end of the adjusting spring is biased against the fixing groove, and a second end of the adjusting spring is fitted with the positioning post.

4. The regulator valve as claimed in claim 3, wherein the valve core assembly further includes a piston part and a core part; the piston part has the piston portion, the positioning post, and a screwing orifice defined on a right side of the piston part; the core part has the closing portion formed on the core part and has a screw bolt arranged on a left end of the core part and screwing with the screwing orifice of the piston portion, such that the screw bolt is adjustably rotated to control a position of the closing portion relative to the seat portion.

5. The regulator valve as claimed in claim 1, wherein the valve core assembly further includes a piston part and a core part; the piston part has the piston portion and a screwing orifice defined on a right side of the piston part; the core part has the closing portion formed on the core part and has a screw bolt arranged on a left end of the core part and screwing with the screwing orifice of the piston portion, such that the screw bolt is adjustably rotated to control a position of the closing portion relative to the seat portion.

6. The regulator valve as claimed in claim 1, wherein the first half taper angle of the inwardly conical fence of the seat portion relative to the seat portion is 45 degrees; the second half taper angle of the first conical face relative to the right cavity is 6.5 degrees; and the third half taper angle of the second conical face relative to the valve hole is 8 degrees more than the first half taper angle of the inwardly conical fence of the seat portion.

* * * * *